US010256756B2

United States Patent
Hirata

(10) Patent No.: US 10,256,756 B2
(45) Date of Patent: Apr. 9, 2019

(54) BRUSHLESS MOTOR APPARATUS SETTING MASK PERIOD ON THE BASIS OF COMPARISON BETWEEN VOLTAGE OF SPECIFIC COIL AND VOLTAGE OF COIL OTHER THAN THE SPECIFIC COIL

(71) Applicant: BROTHER KOGYO KABUSHIKI KAISHA, Nagoya-shi, Aichi-ken (JP)

(72) Inventor: Hironori Hirata, Nagoya (JP)

(73) Assignee: BROTHER KOGYO KABUSHIKI KAISHA, Nagoya-shi, Aichi-Ken (JP)

( * ) Notice: Subject to any disclaimer, the term of this patent is extended or adjusted under 35 U.S.C. 154(b) by 3 days.

(21) Appl. No.: 15/714,338

(22) Filed: Sep. 25, 2017

(65) Prior Publication Data
US 2018/0091073 A1 Mar. 29, 2018

(30) Foreign Application Priority Data

Sep. 27, 2016 (JP) .................................. 2016-188575
Sep. 19, 2017 (JP) .................................. 2017-178999

(51) Int. Cl.
*H02P 27/06* (2006.01)
*H02P 6/182* (2016.01)
*H02P 6/17* (2016.01)

(52) U.S. Cl.
CPC ................ *H02P 6/182* (2013.01); *H02P 6/17* (2016.02); *H02P 27/06* (2013.01)

(58) Field of Classification Search
CPC .... H02P 27/06; H02P 6/20; H02P 6/18; H02P 6/15; H02P 6/182; H02M 7/5395
USPC .............................. 318/798, 727, 801, 400.01
See application file for complete search history.

(56) References Cited

U.S. PATENT DOCUMENTS

| 6,922,027 | B2* | 7/2005 | Schwarz | ................... H02P 6/18 318/400.01 |
| 7,248,016 | B2* | 7/2007 | Hidaka | ................... B62D 5/046 318/432 |
| 7,567,046 | B2* | 7/2009 | Tojima | ....................... H02P 6/06 318/400.02 |
| 7,977,899 | B2* | 7/2011 | Hasegawa | ............... H02P 6/182 318/400.01 |
| 2001/0019249 | A1 | 9/2001 | Kato et al. | |

(Continued)

FOREIGN PATENT DOCUMENTS

| JP | 2001-231286 A | 8/2001 |
| JP | 2006-67746 A | 3/2006 |
| JP | 2015-152802 A | 8/2015 |

*Primary Examiner* — Rina I Duda
(74) *Attorney, Agent, or Firm* — Merchant & Gould P.C.

(57) ABSTRACT

In a brushless motor apparatus, a brushless motor has a rotor and Y-connected coils, and a controller has an inverter circuit selectively driving the coils. The controller detects an induced voltage generated in a specific coil which is not driven by the inverter circuit while the rotor rotates. The controller acquires a positional signal of the rotor on a basis of a timing at which the induced voltage reaches the reference value. The timing is obtained through comparison between the detected induced voltage and a reference value. The controller switches a coil driven by the inverter circuit on a basis of the positional signal, and sets a mask period on a basis of a result of comparison between voltage of the specific coil and a coil other than the specific coil. The comparison between the induced voltage and the reference value is not executed in the mask period.

13 Claims, 11 Drawing Sheets

(56) References Cited

U.S. PATENT DOCUMENTS

| | | | |
|---|---|---|---|
| 2012/0286714 A1* | 11/2012 | Tokunaga | H02P 6/182 |
| | | | 318/400.34 |
| 2013/0147406 A1* | 6/2013 | Kuroda | H02M 7/53875 |
| | | | 318/400.13 |
| 2013/0300329 A1* | 11/2013 | Jeske | H02P 6/182 |
| | | | 318/400.34 |
| 2015/0236627 A1 | 8/2015 | Hirata | |

* cited by examiner

BRUSHLESS MOTOR APPARATUS SETTING MASK PERIOD ON THE BASIS OF COMPARISON BETWEEN VOLTAGE OF SPECIFIC COIL AND VOLTAGE OF COIL OTHER THAN THE SPECIFIC COIL

CROSS REFERENCE TO RELATED APPLICATION

This application claims priorities from Japanese Patent Application Nos. 2016-188575 filed Sep. 27, 2016, and 2017-178999 filed Sep. 19, 2017. The entire contents of the priority applications are incorporated herein by reference.

TECHNICAL FIELD

The present disclosure relates to a brushless motor apparatus and a method for controlling the brushless motor apparatus.

BACKGROUND

There is an well-known technique of a brushless motor for switching energized coils on the basis of an induced voltage generated in each coil without using a Hall element. In such technique, a mask period having a fixed length is provided in a period during which counter electromotive force is generated. In the mask period, voltage caused by the counter electromotive force is not acquired.

SUMMARY

However, in the conventional technique, the mask period has a predetermined fixed length, and thus it is required that the mask period is longer than the period during which counter electromotive force is generated. When the brushless motor rotates at high speed, the mask period is relatively long, and thus it will be more difficult to acquire a switching timing of each coil.

In view of the foregoing, it is an object of the invention to provide a brushless motor apparatus which can switch energized coils with high accuracy by using an induced voltage even when a brushless motor rotates at high speed.

In order to attain the above and other objects, the disclosure provides a brushless motor apparatus. The brushless motor apparatus includes a brushless motor and a controller. The brushless motor has a rotor having a magnet; and a stator having a first coil, a second coil, and a third coil which are Y-connected. The controller has an inverter circuit configured to selectively drive the first coil, the second coil, and the third coil. The controller is configured to: detect an induced voltage generated in a specific coil while the rotor rotates, the specific coil being a coil which is not driven by the inverter circuit among the first coil, the second coil, and the third coil; execute comparison between the detected induced voltage and a reference value; acquire a positional signal of the rotor on a basis of a timing when the detected induced voltage is the reference value, the timing being obtained through the comparison; switch a coil driven by the inverter circuit among the first coil, the second coil, and the third coil on a basis of the positional signal; and set a mask period on a basis of a result of comparison between a voltage of the specific coil and a voltage of a coil other than the specific coil among the first coil, the second coil, and the third coil, wherein the comparison between the induced voltage and the reference value is not executed in the mask period.

According to another aspects, the disclosure provides a method for controlling a brushless motor apparatus. The method includes: detecting an induced voltage generated in a specific coil while the rotor of a brushless motor rotates, the specific coil being a coil which is not driven by the inverter circuit among the first coil, the second coil, and the third coil, a stator of the brushless motor having the first coil, the second coil, and the third coil which are Y-connected; executing comparison between the detected induced voltage and a reference value; acquiring a positional signal of the rotor on a basis of a timing when the detected induced voltage is the reference value, the timing being obtained through the comparison; switching a coil driven by the inverter circuit among the first coil, the second coil, and the third coil on a basis of the positional signal; and setting a mask period on a basis of a result of comparison between a voltage of the specific coil and a voltage of a coil other than the specific coil among the first coil, the second coil, and the third coil, wherein the comparison between the induced voltage and the reference value is not executed in the mask period.

According to still another aspects, the disclosure provides a brushless motor apparatus. The brushless motor apparatus includes a brushless motor and a controller. The brushless motor has a rotor having a magnet and a first coil, a second coil, and a third coil which are Y-connected. The controller has an inverter circuit configured to selectively drive the first coil, the second coil, and the third coil. The controller is configured to: detect an induced voltage generated in a specific coil while the rotor rotates, the specific coil being a coil which is not driven by the inverter circuit among the first coil, the second coil, and the third coil; execute first comparison between the detected induced voltage and a reference value; acquire a positional signal of the rotor on a basis of a timing when the detected induced voltage is a reference value, the timing being obtained through a result of the first comparison; switch a coil by the inverter circuit among the first coil, the second coil, and the third coil on a basis of the positional signal; and set a mask period on a basis of at least one of a result of second comparison and a result of third comparison, the second comparison being comparison between a voltage of the specific coil and a positive side voltage of the invertor circuit, the third comparison being comparison between the voltage of the specific coil and a negative side voltage of the invertor circuit, wherein the first comparison is not executed in the mask period.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An image forming apparatus as an example of a brushless motor apparatus according to an embodiment will be explained while referring to attached drawings. In the embodiment, the invention is applied to a laser printer capable of forming a color image.

Figure 1:
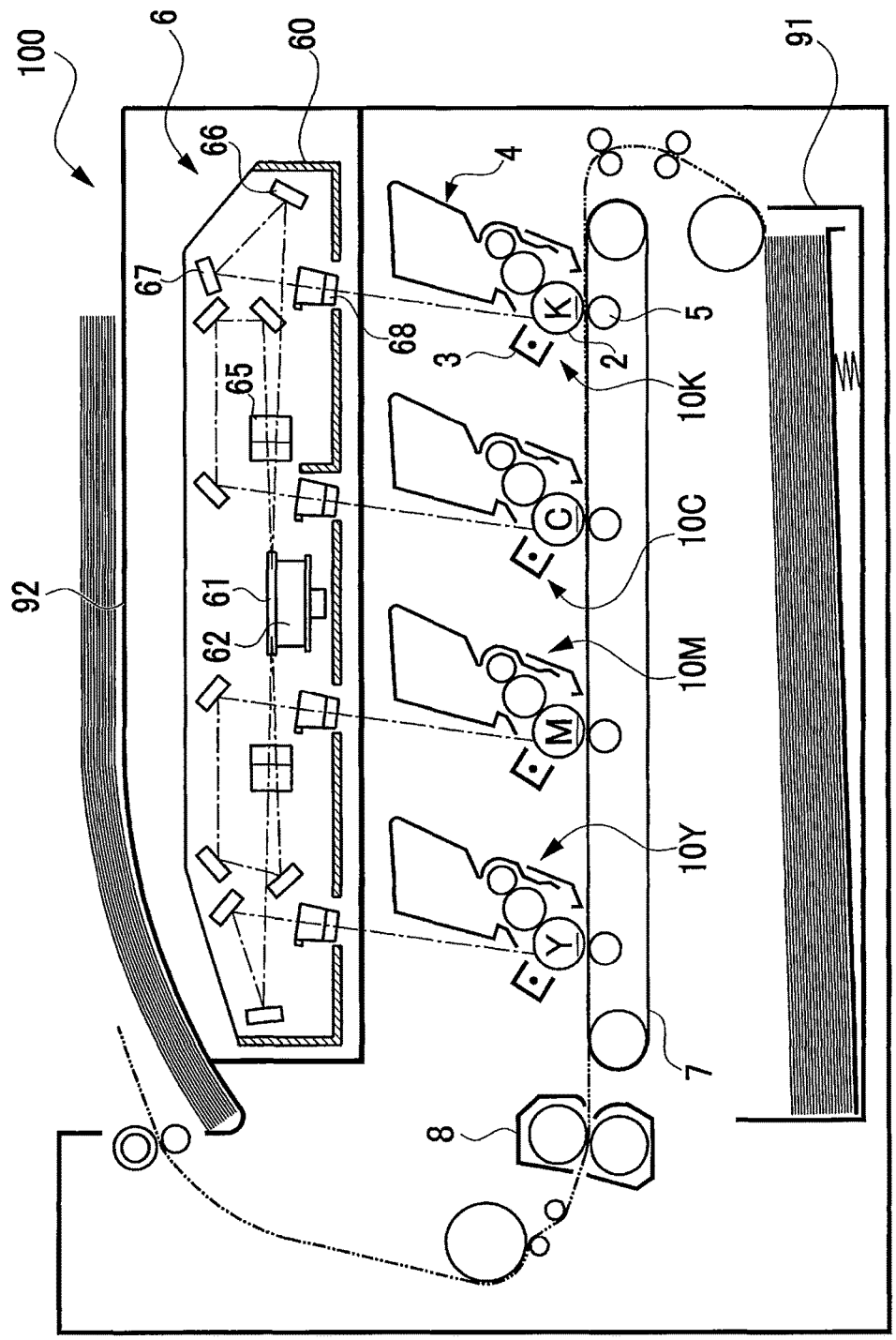
FIG. 1 is a cross section schematically illustrating a structure of a printer according to a first embodiment.

As shown in FIG. 1, a printer 100 is a tandem type color laser printer. The printer 100 includes process devices 10Y, 10M, 10C, and 10K for respective colors of yellow, magenta, cyan, and black. The process device 10K incudes a photosensitive member (photosensitive roller) 2, a charger 3, a developer device 4, and a transferring device 5. The remaining process devices 10Y, 10M, and 10C have the same structure with the process device 10K, and explanations of the structures thereof are omitted. The printer 100 further includes am exposure device 6 which is above the process devices 10Y, 10M, 10C, and 10K and shared by the process devices 10Y, 10M, 10C, and 10K. The printer 100 further includes a conveyance belt 7, a fixing device 8, a paper feeding tray 91, and a paper discharge tray 92.

An entire printing operation of the printer 100 will be explained. In the following description, a printing process by the process device 10K will be explained as an example. In the printing operation, after the charger 3 charges the photosensitive member 2, the exposure device 6 exposes the photosensitive member 2 to light. As a result, an electrostatic latent image based on image data is formed on a surface of the photosensitive member 2. The developer device 4 develops the electrostatic latent image to form a toner image. The printer 100 picks up a sheet accommodated in the paper feeding tray 91 on the sheet-to-sheet basis, and conveys the sheet to the conveyance belt 7. When the sheet passes between the photosensitive member 2 and the transferring device 5, the transferring device 5 transfers the toner image on the photosensitive member 2 to the sheet. Further, the fixing device 8 fixes the toner image located on the sheet. Finally, the sheet is discharged onto the paper discharge tray 92.

When color printing is performed, the process devices 10Y, 10M, and 10C respectively form toner images and transfer the toner images on the sheet so that the toner images are superimposed on the sheet. After the superimposed image is fixed, the color image is formed. The process device 10K may be used in addition to the process devices 10Y, 10M, and 10C in the color printing.

The structure of the exposure device 6 will be explained while referring to FIGS. 1 and 2. As shown in FIG. 1, the exposure device 6 includes a laser diode 63 (FIG. 2) emitting laser light, and various optical components for irradiating the laser light emitted from the laser diode 63, such as, a polygon mirror 61, a coupling lens 64 (FIG. 2), an fθ lens 65, reflection mirrors 66 and 67, and a toric lens 68. The laser diode 63 is an example of a light source and the polygon mirror 61 is an example of a reflecting mirror.

Figure 2:
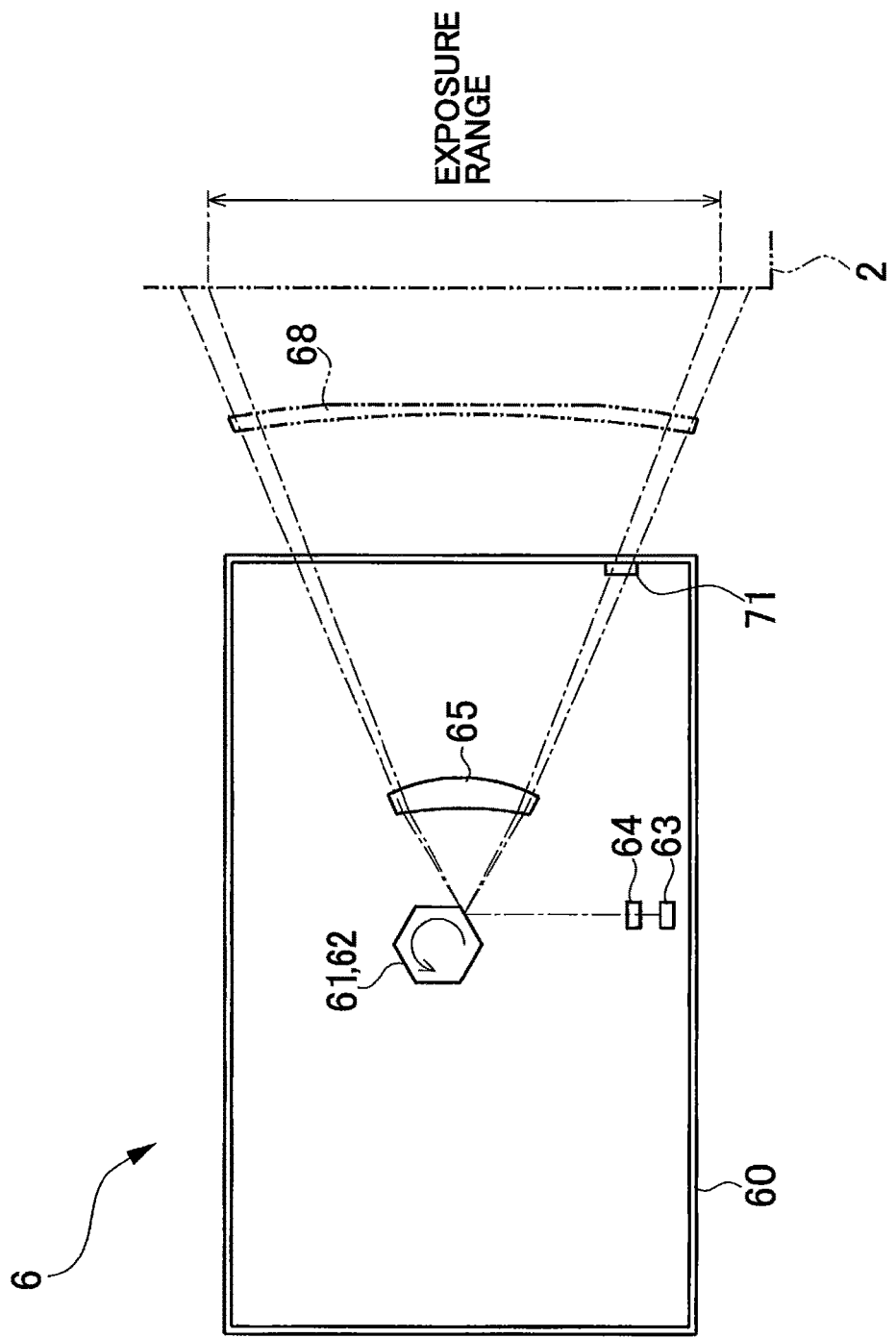
FIG. 2 is an explanatory diagram schematically illustrating a structure of an exposure device in the printer.

FIG. 2 shows a part of the exposure device 6 concerning the process device 10K seeing from upper side of FIG. 1 while omitting the reflection mirrors 66 and 67 and simplifying an optical path which is actually bended subsequent to reflection by the reflection mirrors 66 and 67. Right end of FIG. 2 shows a schmatic position of the photosensitive member 2 for explanation but does not indicates an actual position of the photosensitive member 2.

Figure 3:
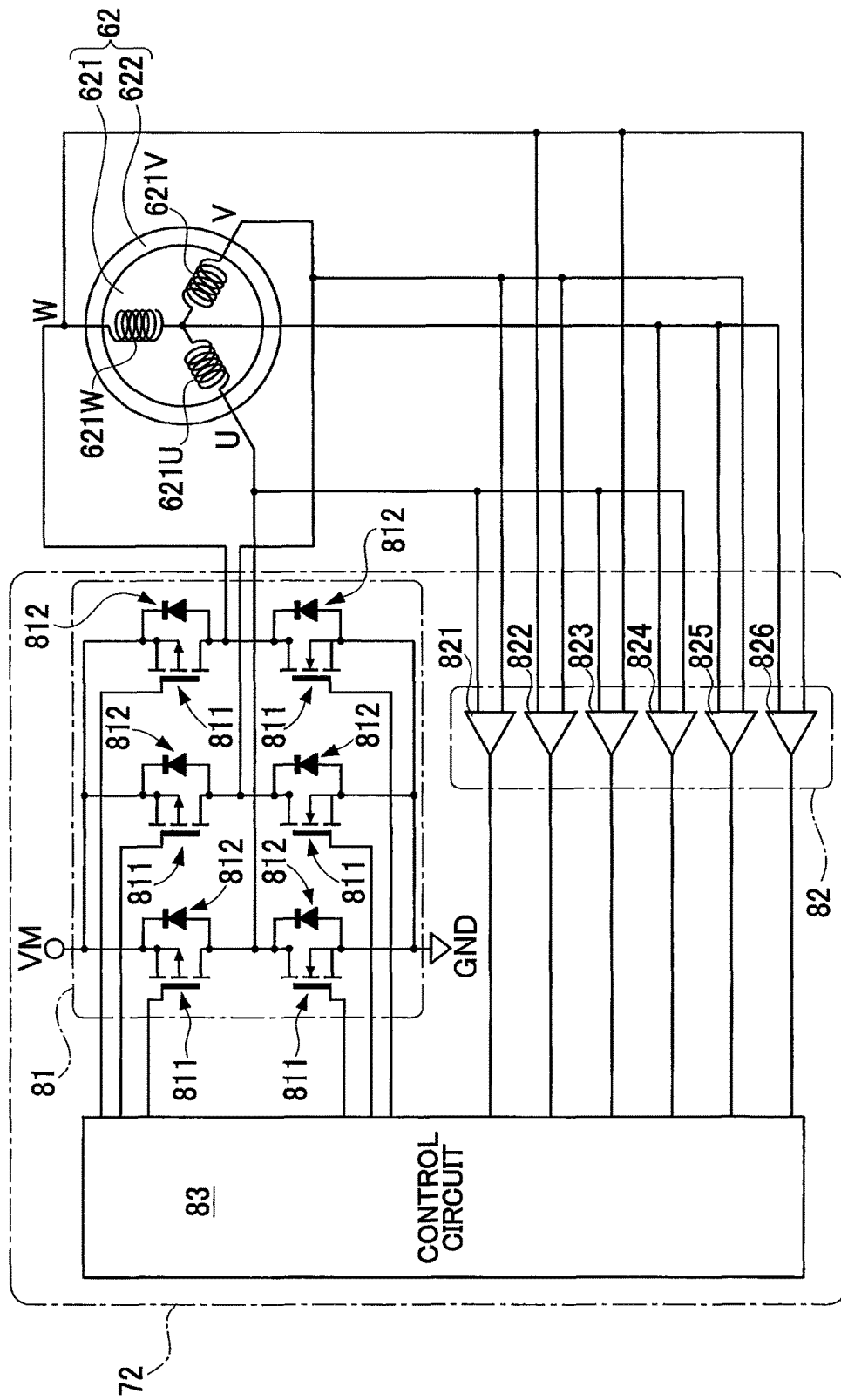
FIG. 3 is a schematic diagram illustrating structures of a brushless motor and a motor driving section.

As shown in FIG. 3, the printer 100 further includes a brushless motor 62 for rotating the polygon mirror 61. The brushless motor 62 includes a stator 621 and a rotor 622. The stator 621 includes Y-connected threes coils 621U, 621V, and 621W for 3-phases (U-phase, V-phase, and W-phase). The rotor 622 includes permanent magnets. A plurality of magnet poles are generated by the magnets so that so that the north pole and the south pole arranged are alternately arranged in a peripheral direction of the rotor 622. The rotor 521 is an example of a rotator. The coils 621U, 621V, and 621W are for U-phase, V-phase, and W-phase, respectively. Each of the coils 621U, 621V, and 621W has one terminal and another terminal, and all of one terminals of the coils 621U, 621V, and 621W are connected at a neutral point to provide the Y-connection. The polygon mirror 61 is connected to the rotor 622 of the brushless motor 62 and rotates together with rotor 622. A control of the brushless motor 62 will be explained later in detail.

As shown in FIG. 2, in the exposure device 6, the laser light emitted from the laser diode 63 is converted to light beam via the coupling lens 64, and the light beam enters the polygon mirror 61. The polygon mirror 61 has a regular hexagon shape. When forming an image, the polygon mirror 61 is rotated at a constant high speed by the brushless motor 62, and reflects the light beam. The light beam is deflected according to the rotation of the polygon mirror 61 and scanned from bottom side to top side in FIG. 2.

As shown in FIG. 1, the laser beam reflected by the polygon mirror 61 is irradiated to the photosensitive member 2 via the fθ lens 65, the reflection mirrors 66 and 67, and the toric lens 68. Specifically, one line worth area on the photosensitive member 2 is exposed to the light beam reflected one surface of the polygon mirror 61, thereby forming one line worth of electrostatic latent image. Here, one line extends in an axial direction of the photosensitive member 2. In FIG. 2, an exposure range indicates a region which is exposed in the axial direction, that is, a region in which an image is to be formed.

As shown in FIG. 2, the exposure device 6 includes a housing 60, the laser diode 63, the brushless motor 62, the polygon mirror 61, and a BD (beam detect) sensor 71 located on an inner surface of a wall of the housing 60. The BD sensor 71 is configured to receive the light beam reflected by the polygon mirror 61. The BD sensor 71 outputs different BD signals depending on whether the light is received or not. The signal outputted from the BD sensor 71 is used not only to acquire the rotational speed of the brushless motor 62 but also to determine start writing the scan line. Thus, the BD sensor 71 is located at a position before the laser light enters the exposure range. The BD sensor 71 is an example of an optical sensor. The BD signal is used to determine a timing when exposure of each scanning line (or, writing each scanning line) starts by the light beam, for example.

Figure 4:
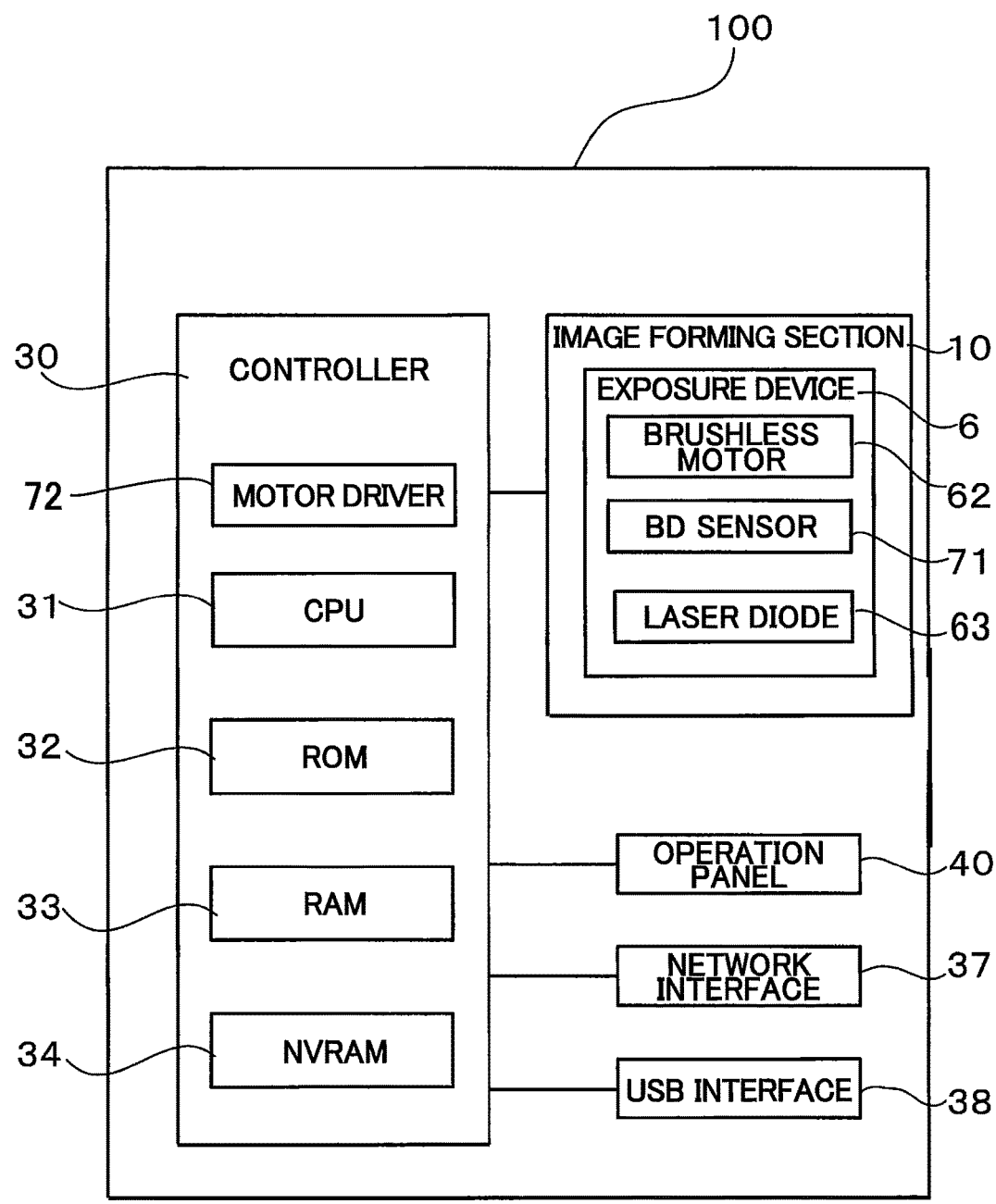
FIG. 4 is a block diagram illustrating an electrical structure of the printer.

An electrical structure of the printer 100 will be explained. As shown in FIG. 4, the printer 100 includes a controller 30 having a CPU 31, a ROM 32, a RAM 33, an NVRAM (nonvolatile RAM) 34, and a motor driver (or, motor driving section)72. The printer 100 further includes an image forming section (or, image forming machine) 10 having the exposure device 6 and the process devices 10Y, 10M, 10C, and 10K, an operation panel 40, a network interface 37, and a USB interface 38, which are electrically connected to the controller 30.

The ROM 32 stores various control programs, various settings, and various initial values for controlling the printer 100. The RAM 33 is used as a work area for storing each control program, and a storage area for temporarily store various data. The CPU 31 controls each component of the printer 100 while performing processes according to the control programs read from the ROM 32 and storing the results of the processes in the RAM 33 or the NVRAM 34. The controller 30 shown in FIG. 4 is a general term of hardware used for control of the printer 100 such as CPU 31, but does not necessarily indicate a single hardware provided in the printer 100.

The network interface 37 is hardware for performing communications with apparatuses connected to network. The USB interface 38 is hardware capable of connecting with apparatuses on the basis of the USB standard for performing communications with the connected apparatuses. The operation panel 40 is hardware for displaying notification to a user and for receiving an instruction by the user.

The motor driving section 72 includes an inverter circuit 81 (FIG. 2). The inverter circuit 81 selectively switches drives of the coils 621U, 621V, and 621W in the brushless motor 62 to control rotation of the brushless motor 62. The brushless motor 62 and the controller 30 configure a brushless motor apparatus.

The motor driving section 72 of the brushless motor 62 will be explained. As shown in FIG. 3, the motor driving section 72 includes the inverter circuit 81, a comparator 82, and a control circuit 83. The control circuit 83 is electrically connected to the inverter circuit 81 and the comparator 82. The comparator 82 includes the plurality of comparators 821-826. The inverter circuit 81 switches an energized state and a non-energized state of each of the coils 621U, 621V, and 621W so as to selectively drive each of the coils 621U, 621V, and 621W.

The inverter circuit 81 is located between a power supply VM and a ground GND. That is, an electric potential of the inverter circuit 81 is between a potential of the power supply VM and a potential of the ground GND. The voltage is selectively applied to each of the coils 621U, 621V, and 621W on the basis of drive signal from the control circuit 83. The comparator 82 includes the UV comparator 821, the WV comparator 822, the UW comparator 823, the UC comparator 824, the VC comparator 825, and the WC comparator 826. The UV comparator 821 compares a voltage of the U-phase and a voltage of the V-phase. The WV comparator 822 compares a voltage of the W-phase and the voltage of the V-phase. The UW comparator 823 compares the voltage of the U-phase and the voltage of the W-phase. Here, the voltages of the U-, V-, and W-phases (or, the U-phase voltage, the V-phase voltage, and the W-phase voltage) indicate respectively voltages of terminals of the coils 621U, 621V, and 621W which are opposite side of the neutral point. The UC comparator 824 compares the voltage of the U-phase and a voltage of the neutral point. The VC comparator 825 compares the voltage of the V-phase and the voltage of the neutral point. The WC comparator 826 compares the voltage of the W-phase and the voltage of the neutral point. The control circuit 83 outputs signals for switching drive (or energized state) of the coils 621U, 621V, and 621W to the inverter circuit 81 on the basis of the signals outputted from the comparator 82 so as to rotate the brushless motor 62.

Figure 5:
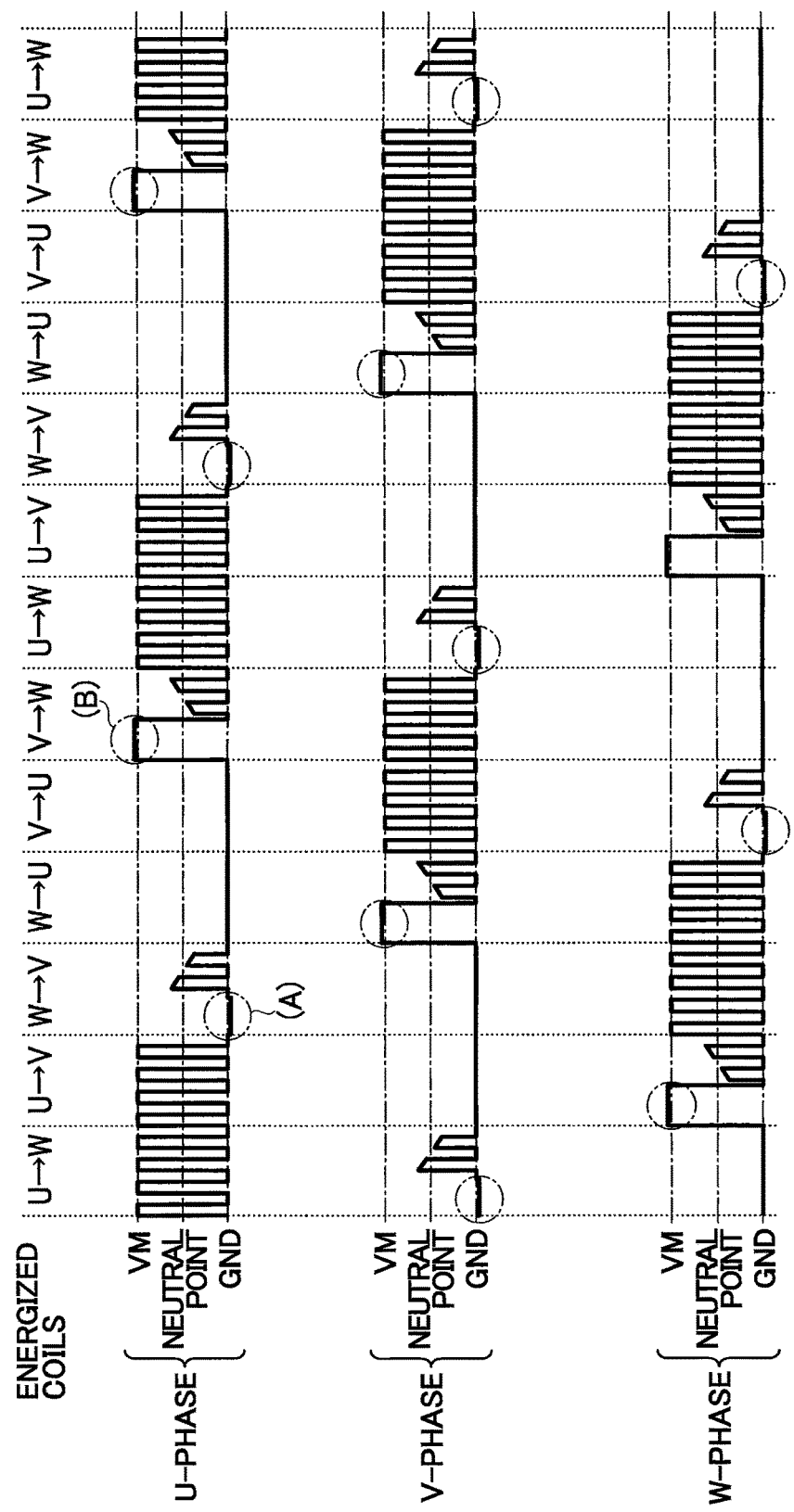
FIG. 5 is a wave form chart illustrating an example of induced voltages generated in coils in the brushless motor.

The motor driving section 72 detects a rotational position of the rotor 622 without using a position detection element such as a Hole element. When the rotor 622 rotates, an S pole and an N pole of the magnet in the rotor 622 alternately approach each of the coils 621U, 621V, and 621W. The approach of the rotor 622 causes change of the magnetic flux in each of the coils 621U, 621V, and 621W, and an induced voltage is generated in the coils 621U, 621V, and 621W. As shown in FIG. 5, the induced voltage has a periodically varying waveform (see portions W→V and V→W). A part of the waveform when the S pole approaches the coils 621U, 621V, and 621W is different from a part of the waveform when the N pole approaches the coils 621U, 621V, and 621W. By detecting the induced voltage, the controller 30 detects a rotational position of the rotor 622 or detects which of the magnetic pole approaches the coils 621U, 621V, and 621W.

The motor driving section 72 changes a duty ratio in an energizing period of each of the coils 621U, 621V, and 621W for controlling a rotational speed of the brushless motor 62. Specifically, the motor driving section 72 acquires the rotational speed of the brushless motor 62 and compares the acquired rotational speed with a target speed. When accelerating the brushless motor 62, the motor driving section 72 increases the duty ratio in the energizing period for each of the coils 621U, 621V, and 621W. When decelerating the brushless motor 62, the motor driving section 72 reduces the duty ratio in the energizing period for each of the coils 621U, 621V, and 621W. Accordingly, the motor driving section 72 performs the rotational speed control for accelerating, decelerating, and maintaining the rotational speed of the brushless motor 62.

The motor driving section 72 can perform two types of rotational speed controls of the brushless motor 62 including a first control and a second control. In the first control, the motor driving section 72 acquires the rotational speed of the brushless motor 62 on the basis of the induced voltages generated in the coils 621U, 621V, and 621W. In the second control, the motor driving section 72 acquires the rotational speed of the brushless motor 62 on the basis of the output signals from the BD sensor 71. The motor driving section 72 performs the first control until the rotational speed reaches a prescribed threshold value after the brushless motor 62 starts rotating. The motor driving section 72 performs the second control after the rotational speed reaches the prescribed threshold value.

In the second control, the laser diode 63 is required to output the laser light because the output signal of the BD sensor 71 is used in the second control. In a conceivable case where the second control is performed when the brushless motor 62 rotates at low speed, the laser beam moves on the photosensitive member 2 at low speed. In this case, it is likely that the photosensitive member 2 is damaged. On the other hand, when the brushless motor 62 rotates at high speed, the rotational speed can be acquired by using the output signal of the BD sensor 71 with higher accuracy than by using the induced voltage of the coils 621U, 621V, and 621W. Accordingly, the printer 100 changes the rotational speed control depending on the rotational speed. That is, when the brushless motor 62 rotates at low speed, the first control is used as the rotational speed control. When the brushless motor 62 rotates at high speed, the second control is used as the rotational speed control.

The control circuit 83 switches drive of (or, energized states of) the coils 621U, 621V, and 621W on the basis of comparison between an induced voltage generated in each of the coils 621U, 621V, and 621W and a voltage of the neutral point of the Y connection. That is, when the control circuit 83 receives a signal indicating that the induced voltage reaches the voltage of the neutral point, the control circuit 83 changes (switches) the coil which is a target of drive (energizing). "The induced voltage reaches the voltage of the neutral point" means that the magnitude correlation between the induced voltage and the voltage of the neutral point is changed. The voltage of the neutral point is an example of a reference value. The signal indicating that the induced voltage reaches the voltage of the neutral point is a zero cross signal and an example of a positional signal.

As shown in FIG. 5, the motor driving section 72 changes the energizing states of the coils 621U, 621V, and 621W in an order of U→W, U→V, W→V, W→U, V→U, and V→W. Here, for example, U→W indicates an energized state where the coils 621U and 621V are energized so that a current flows from the coil 621U to the coil 621W. After the energized state is changed V→W, the energized stat is returns to U→W and repeats the change of the energized state in the above described order. In other words, a positive side (high voltage side) of the coil is changed in the cyclic order of the U-phase, W-phase, and V-phase. A negative side (low voltage side) of the coil is changed in the cyclic order of the V-phase, U-phase, and W-phase (equivalent to the cyclic order of the U-phase, W-phase, and V-phase) at an intermediate timing between a timing when the positive side of one coil is changed (switched) and a timing when the positive side of next coil is changed (switched). Accordingly, the energized coils, which are targets of drive, are changed in the order of the U-phase, the W-phase, and the V-phase.

As shown in FIG. 3, the inverter circuit 81 includes six switching elements 811 and six freewheeling diodes 812 which are respectively connected to the six switching elements 811 in parallel. After the positive side coil which is a target of drive is changed on the basis of the signal outputted from the control circuit 83, a current is generated by counter electromotive force generated in the coil which was energized. The generated current flows to the power supply VM via the freewheeling diode 812. After the negative side coil which is a target of drive is changed on the basis of the signal outputted from the control circuit 83, a current is generated by counter electromotive force generated in the coil which was energized. The generated current flows to the ground GND via the freewheeling diode 812. For example, immediately after the U→V state changes to the W→V state, as shown in (A) of FIG. 5, a voltage according to the counter electromotive force, which is lower than the ground voltage, is generated at a terminal of the coil 621U which is opposite to the neutral point. Hereinafter, a voltage according to the counter electromotive force is referred to as a counter electromotive voltage and the voltage shown in (A) of FIG. 5 is referred to as a counter electromotive voltage (A). Immediately after the V→U state changes to the V→W state, as shown in (B) of FIG. 5, a voltage according to the counter electromotive force, which is higher than the voltage of the power supply VM, is generated at the terminal of the coil 621U which is opposite to the neutral point. Hereinafter, the voltage shown in (B) of FIG. 5 is referred to as a counter electromotive voltage (B).

The motor driving section 72 compares the voltage of the non-energized coil with the voltage of the neutral point and acquires a signal indicating that the counter induced voltage reaches the voltage of the neutral point, in a period excluding both a period in which the counter electromotive voltage (A) is generated and a period in which the counter electromotive voltage (B) is generated. For example, when performing a control for switching a target of drive (or, switching energized coils) on the basis of the result outputted from the UC comparator 824 in the period of the W→V state (hereinafter referred to as the W→V period), the period in which the counter electromotive voltage (A) is generated is set to a mask period in which the comparison between the voltage of the non-energized coil and the voltage of the neutral point is not executed. The motor driving section 72 acquires the rotational position of the rotor 622 on the basis of the result of comparison in a period other than the mask period.

For example, in the W→V period, a current flows from the coil 621W to the coil 621V, and the voltage of the terminal of the coil 621V opposite to the neutral point is maintained to that of GND. The counter electromotive voltage (A) generated in the coil 621U is lower than the GND as described above. The motor driving section 72 compares the U-phase voltage with the V-phase voltage in the W→V period, and sets the mask period to a period in which the U-phase voltage is lower than the V-phase voltage in the W→V period. That is, after the motor driving section 72 shifts to the W→V state, the motor driving section 72 does not switch the target of drive on the basis of the signal outputted from the UC comparator 824 during a period in which the signal outputted from the UV comparator 821 indicates the following relation: U-phase voltage<V-phase voltage. Subsequently, the motor driving section 72 switches the target of drive on the basis of the signal outputted from the UC comparator 824 in a case where the signal outputted from the UC comparator 824 indicates the relation U-phase voltage<voltage C in a period in which the signal outputted from the UV comparator 821 indicates the relation: U-phase voltage>V-phase voltage. Here, the voltage C indicates the voltage of the neutral point.

Similarly, in the V→W period, the maximum voltage of the V-phase is VM. On the other hand, the counter electromotive voltage (B) generated in the coil 621U is higher than VM. The motor driving section 72 sets the mask period to a period in which the U-phase voltage is higher than the V-phase voltage in the V→W period. That is, the motor driving section 72 shifts to the V→W state, the motor driving section 72 does not switch the target of drive on the basis of the signal outputted from the UC comparator 824 during a period in which the signal outputted from the UV comparator 821 indicates the following relation: U-phase voltage>V-phase voltage. The motor driving section 72 switches the target of drive on the basis of the signal outputted from the UC comparator 824 in a case where the signal outputted from the UC comparator 824 indicates U>C during a period in which the signal outputted from the UV comparator 821 indicates the relation: U-phase voltage V-phase voltage.

In the embodiment, detection periods for detecting the zero cross signal and the mask periods, in which no comparison between the voltage of the non-energized coil and the voltage of the neutral point is executed, are set as shown in the followings.

(1) In a case where the zero cross signal of the U-phase is detected (energized state is V→W or W→V), the mask period is set when U-phase voltage>V-phase voltage and U-phase voltage>W-phase voltage, the detection period is set when U-phase voltage>V-phase voltage and U-phase voltage<W-phase voltage, the mask period is set when U-phase voltage<V-phase voltage and U-phase voltage<W-phase voltage, and the detection period is set when U-phase voltage<V-phase voltage and U-phase voltage>W-phase voltage.

(2) In a case where the zero cross signal of the V-phase is detected (energized state is U→W or W→U), the mask period is set when V-phase voltage>U-phase voltage and V-phase voltage>W-phase phase voltage, the detection period is set when V-phase voltage>U-phase voltage and V-phase voltage<W-phase voltage, the mask period is set when V-phase voltage<U-phase voltage and V-phase voltage<W-phase voltage, and the detection period is set when V-phase voltage<U-phase voltage and V-phase voltage>W-phase voltage.

(3) In a case where the zero cross signal of the W-phase is detected (energized state is U→V or V→U), the mask period is set when W-phase voltage>U-phase voltage and W-phase voltage>V-phase voltage, the detection period is set when W-phase voltage>U-phase voltage and W-phase voltage<V-phase voltage, the mask period is set when W-phase voltage<U-phase voltage and W-phase voltage<V-phase voltage, and the detection period is set when W-phase voltage<U-phase voltage and W-phase voltage>V-phase voltage.

Figure 6:
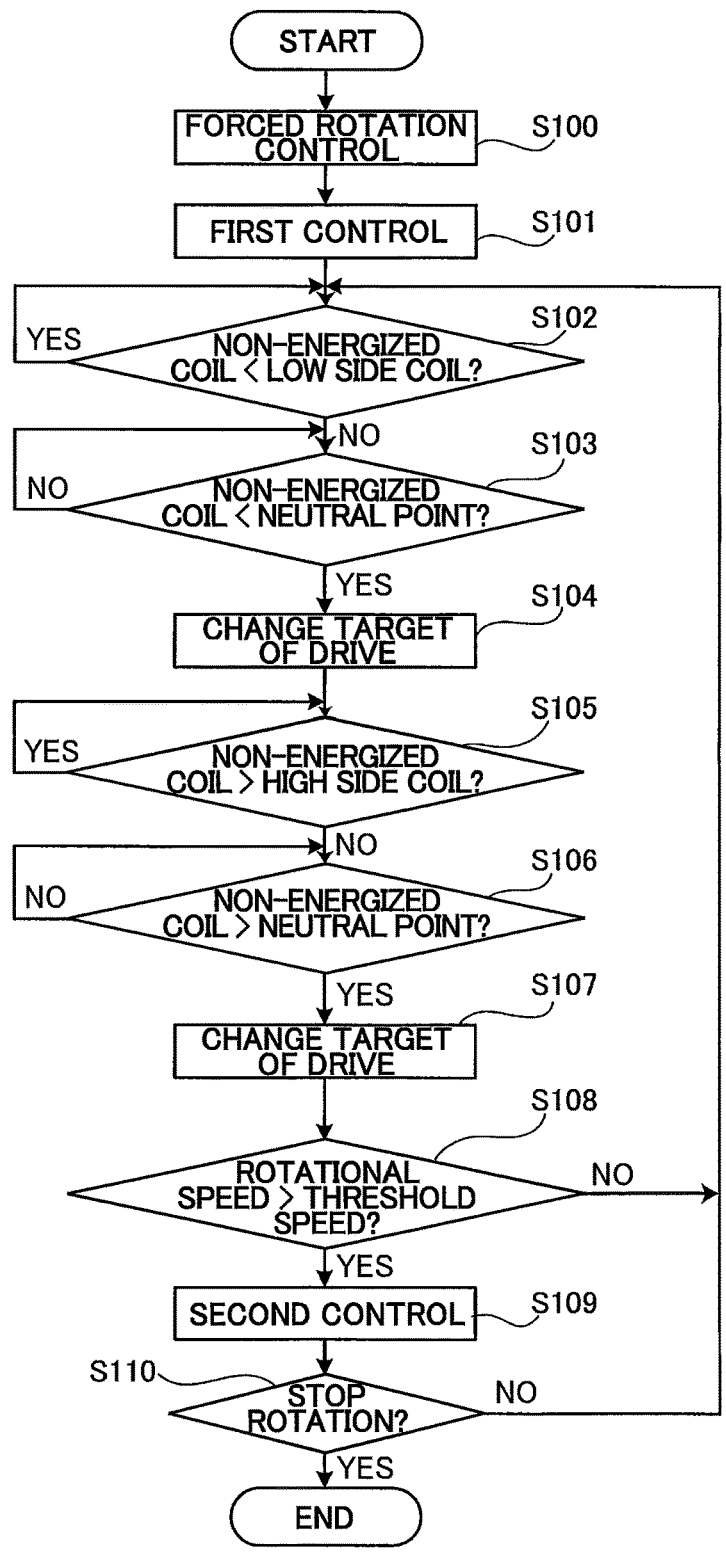
FIG. 6 is a flowchart illustrating a process for controlling rotation of the brushless motor according to the first embodiment.

A process for controlling rotation of the brushless motor 62 will be explained while referring to a flowchart shown in FIG. 6. The process shown in FIG. 6 is triggered by starting rotation of the polygon mirror 61 following reception of a print job, for example.

In S100, the motor driving section 72 performs a forced rotation control so as to rotate the brushless motor 62 until the motor driving section 72 can acquire an induced voltage. In the forced rotation control, the control circuit 83 outputs a prescribed signal to the inverter circuit 81 so that the motor driving section 72 starts energizing specific coils in the brushless motor 62 as targets of drive and switches target coils at prescribed timings. As described above, the energized state of the brushless motor 62 is one of the six energized states U→W, U→V, W→V, W→U, V→U, and V→W. In the following explanation, in each energized state, a coil of high voltage side between energized two coils is referred to as a high side coil, a coil of low voltage side between energized two coils is referred to as a low side coil, and a coil which is not energized is referred to as a non-energized coil. Each of the high side coil, the low side coil, and the non-energized coil is switched in the cyclic order of U-phase, W-phase, and V-phase.

Once the induced voltage is acquired, in S101 the motor driving section 72 acquires rotational speed of the brushless motor 62 on the basis of the induced voltage, and performs the first control for controlling the rotational speed to reach a target rotational speed.

Further, after the induced voltage is acquired, the motor driving section 72 switches energizing coils by using the induced voltage. The followings explain an example where the high side coil is firstly switched after the induced voltage is acquired. In this case, in S102 the motor driving section 72 compares the voltage of the non-energized coil and the low side coil on the basis of the signals outputted from the comparator 82 and determines whether the voltage of the non-energized coil is lower than the voltage of the low side coil. The motor driving section 72 make this determination on the basis of output signals from the UV comparator 821, the WV comparator 822, or the UW comparator 823 in the comparator 82.

While it is determined that the voltage of the non-energized coil is lower than the voltage of the low side coil (S102: YES), the motor driving section 72 repeatedly performs the determination S102. When the voltage of the non-energized coil is lower than the voltage of the low side coil, the negative counter electromotive voltage (A) is generated in the non-energized coil as shown in FIG. 5. A period during which the negative counter electromotive voltage (A) is generated in the non-energized coil is the mask period. Thus, the motor driving section 72 does not compare the voltage of the non-energized coil with the voltage of the neutral point. S102 is an example of a first mask setting process.

When it is determined that the voltage of the non-energized coil is not lower than the voltage of the low side coil (S102: NO), in S103 the motor driving section 72 compares the voltage of the non-energized coil with the voltage of the neutral point on the basis of the signal outputted from the comparator 82. Specifically, in S103 the motor driving section 72 determines whether the voltage of the non-energized coil is lower than the voltage of the neutral point. Specifically, the motor driving section 72 generates zero cross signal on the basis of the UC comparator 824, the VC comparator 825, or the WC comparator 826 in the comparator 82, and make the determination by acquiring the zero cross signal. S103 is an example of a positional signal acquisition process. Because the comparison (S103) between the voltage of the non-energized coil and the neutral point is not executed until the voltage of the non-energized coil is higher than or equal to the low side coil (S102: NO), the period in which YES determination is made in S102 corresponds to the mask period.

While it is determined that the voltage of the non-energized coil is not lower than the voltage of the neutral point (S103: NO), the motor driving section 72 repeatedly performs the determination S103. When the voltage of the non-energized coil is not lower than the voltage of the neutral point, the present time does not reach a timing for changing (switching) the target of drive as shown in FIG. 5.

When it is determined that the voltage of the non-energized coil is lower than the voltage of the neutral point (S103: YES), in S104 the motor driving section 72 changes (switches) the target of drive. That is, the control circuit 83 changes signal outputted to the inverter circuit 81 so as to exchange the non-energized coil and the low side coil. That is, the present non-energized coil is changed (switched) to be a low side coil and the present low side coil is changed to be a non-energized coil. S104 is an example of a changing process.

In S105 the motor driving section 72 compares the voltage of the non-energized coil with the voltage of the high side coil on the basis of the signal outputted from the comparator 82. Specifically, in S105 the motor driving section 72 determines whether the voltage of the non-energized coil is higher than the voltage of the high side coil. The motor driving section 72 make the determination S105 on the basis of signals outputted from the UV comparator 821, the WV comparator 822, or the UW comparator 823 in the comparator 82.

While it is determined that the voltage of the non-energized coil is higher than the voltage of the high side coil (S105: YES), the motor driving section 72 repeatedly performs the determination S105. When the voltage of the non-energized coil is higher than the voltage of the high side coil, the positive counter electromotive voltage (B) is generated in the non-energized coil as shown in FIG. 5. A period during which the positive counter electromotive voltage (B) is generated is the mask period. Thus, the motor driving section 72 does not compares the voltage of the non-energized coil and the neutral point. S105 is an example of a first mask setting process. Because the comparison (S106) between the voltage of the non-energized coil and the neutral point is not executed until the voltage of the non-energized coil is lower than or equal to the high side coil (S105: NO), the period in which the YES determination is made in S105 corresponds to the mask period.

When it is determined that the voltage of the non-energized coil is not higher than the voltage of the high side coil (S105: NO), in S106 the motor driving section 72 compares the voltage of the non-energized coil and the voltage of the neutral point on the basis of the signal outputted from the comparator 82. In S106, the motor driving section 72 determines whether the voltage of the non-energized coil is higher than the voltage of the neutral point. Specifically, the motor driving section 72 generates zero cross signal on the basis of the UC comparator 824, the VC comparator 825, or the WC comparator 826 in the comparator 82, and make the determination by acquiring the zero cross signal. S106 is an example of a positional signal acquisition process.

While it is determined that the voltage of the non-energized coil is not higher than the voltage of the neutral point (S106: NO), the motor driving section 72 repeatedly performs the determination S106. When the voltage of the non-energized coil is not higher than the voltage of the neutral point, a present time does not reach the timing for changing the target of drive.

When it is determined that the voltage of the non-energized coil is higher than the voltage of the neutral point (S106: YES), in S107 the motor driving section 72 changes (switches) the target of drive. That is, the control circuit 83 changes signal outputted to the inverter circuit 81 so as to exchange the non-energized coil and the high side coil. That is, the present non-energized coil is changed (switched) to be a high side coil and the present high side coil is changed to be a non-energized coil. S107 is an example of a changing process.

In S108 the motor driving section 72 determines whether the rotational speed of the brushless motor 62 is faster than a prescribed threshold speed. When it is determined that the rotational speed of the brushless motor 62 is not faster than the prescribed threshold speed (S108: NO), the motor driving section 72 returns to S102, and compares the non-energized coil and the low side coil. In this case, execution of the first control is continued.

On the other hand, when it is determined that the rotational speed of the brushless motor 62 is faster than the prescribed threshold speed (5108: YES), in S109 the motor driving section 72 performs the second control in which the rotational speed of the brushless motor 62 is acquired on the basis of the BD signal outputted from the BD sensor 71. In the second control, the motor driving section 72 controls the rotational speed to be the target rotational speed. That is, motor driving section 72 performs a feedback control so that the rotational speed to be the target rotational speed on the basis of the BD signal.

In S110 the motor driving section 72 determines whether an instruction to stop rotation of the motor driving section 72 is received from the controller 30 for example. When it is determined that the instruction is not received (S110: NO), the motor driving section 72 returns to S102. Until the instruction is received, the motor driving section 72 continues switching energized coils on the basis of the induced voltage. When it is determined the instruction is received, the motor driving section 72 ends the process shown in FIG. 6. When it is determined that the instruction is received (S110: YES), the motor driving section 72 stops the rotation of the motor and ends the process shown in FIG. 6.

Figure 7:
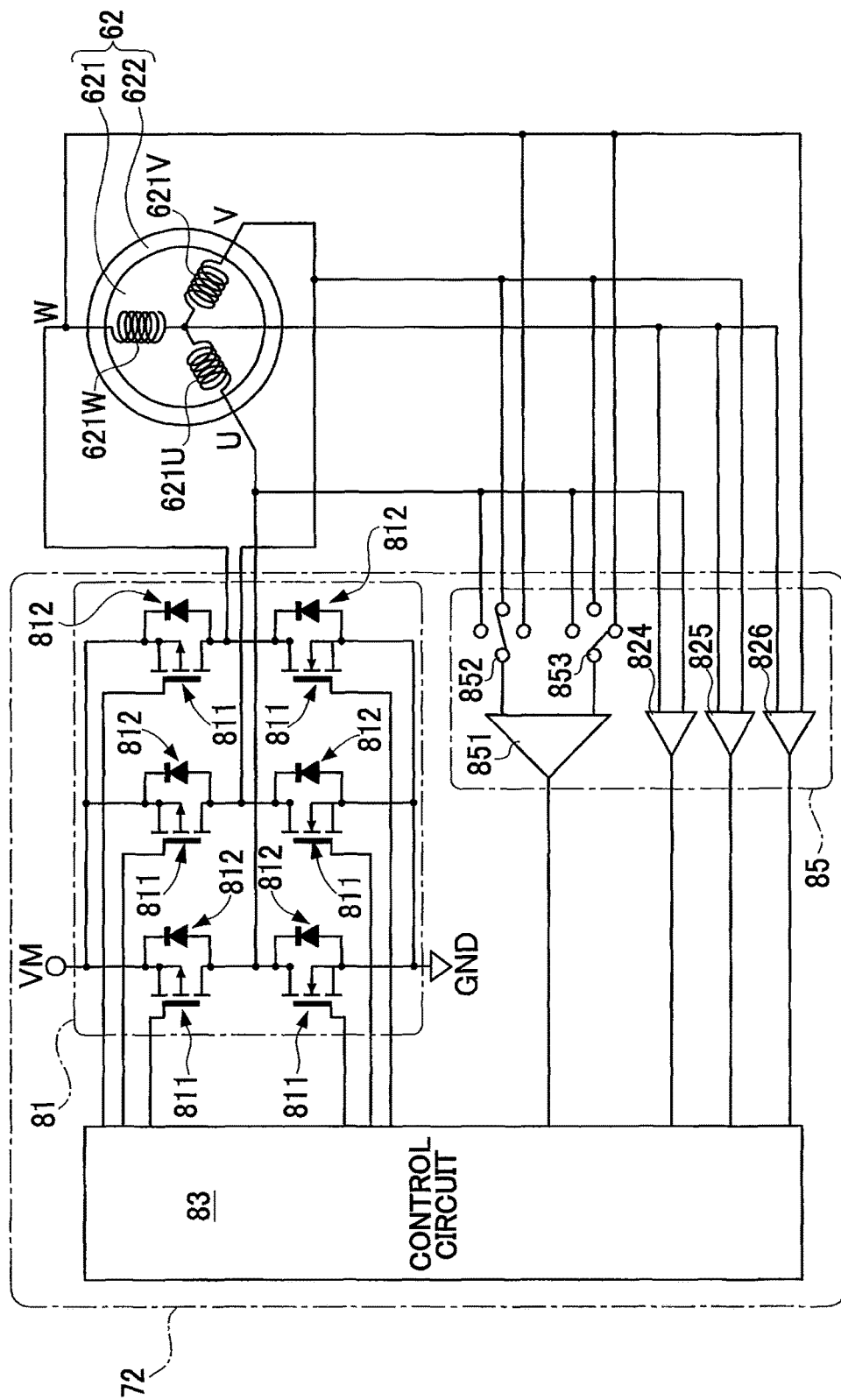
FIG. 7 is a schematic diagram illustrating structures of the brushless motor and a motor driving section according to a modification of the first embodiment.

In the embodiment, as shown in FIG. 3, the comparator 82 of the motor driving section 72 includes the UV comparator 821, the WV comparator 822, and the UW comparator 823. However, the configuration of the comparator 82 is not limited to this. For example, as shown in FIG. 7, the motor driving section 72 may include a comparator 85 having a comparator 851, switches 852 and 853, and the UC comparator 824, the VC comparator 825, and the WC comparator 826. The comparator 851 has one terminal connected to the switch 852 and another terminal connected to the switch 853. That is, the comparator 851 compares voltages inputted from the switches 852 and 853. The switch 852 connects the one terminal of the comparator 851 to selective one of the U-phase coil 621U, the V-phase coil 621V, and the W-phase coil 621W. The switch 853 connects the another terminal of the comparator 851 to selective one of the U-phase coil 621U, the V-phase coil 621V, and the W-phase coil 621W. The comparator 85 can performs the process the same as the process performed by the comparator 82 (the UV comparators 821, 822, and 823) while setting each of switches 852 and 853 to be connected to corresponding one of the coils 621U, 621V, and 621W. For example, instead of using the result of comparison by the UV comparator 821, the result of the comparator 851 can be used while the switches 852 and 853 are respectively connected to the U-phase coil and the V-phase coil.

According to the printer 100 as explained above, the motor driving section 72 sets the mask period to a period during which the induced voltage is generated. Here, the period during which the induced voltage is generated is acquired on the basis of the results of comparison using the UV comparator 821, the UV comparator 821, and the WV comparator 822 in the comparator 82. When the induced voltage is generated, voltage of the specific coil which is in the non-energized period is higher than the coils other than the specific coil, or the specific coil is lower than the coils other than the specific coil. Accordingly, by comparing the voltage of the specific coil in the non-energized period with the voltage of other coils, the period during which the induced voltage is generated can be accurately recognized, and thus the mask period is set with high accuracy. As a result, the printer 100 can switches the energized coils on the basis of the induced voltage more properly than the case where the mask period is fixedly set even if the brushless motor 62 rotates at high speed.

A second embodiment of the image forming apparatus wherein like parts and components are designated with the same reference numerals to avoid duplicating description. The comparator of the second embodiment is different from that of the first embodiment.

Figure 8:
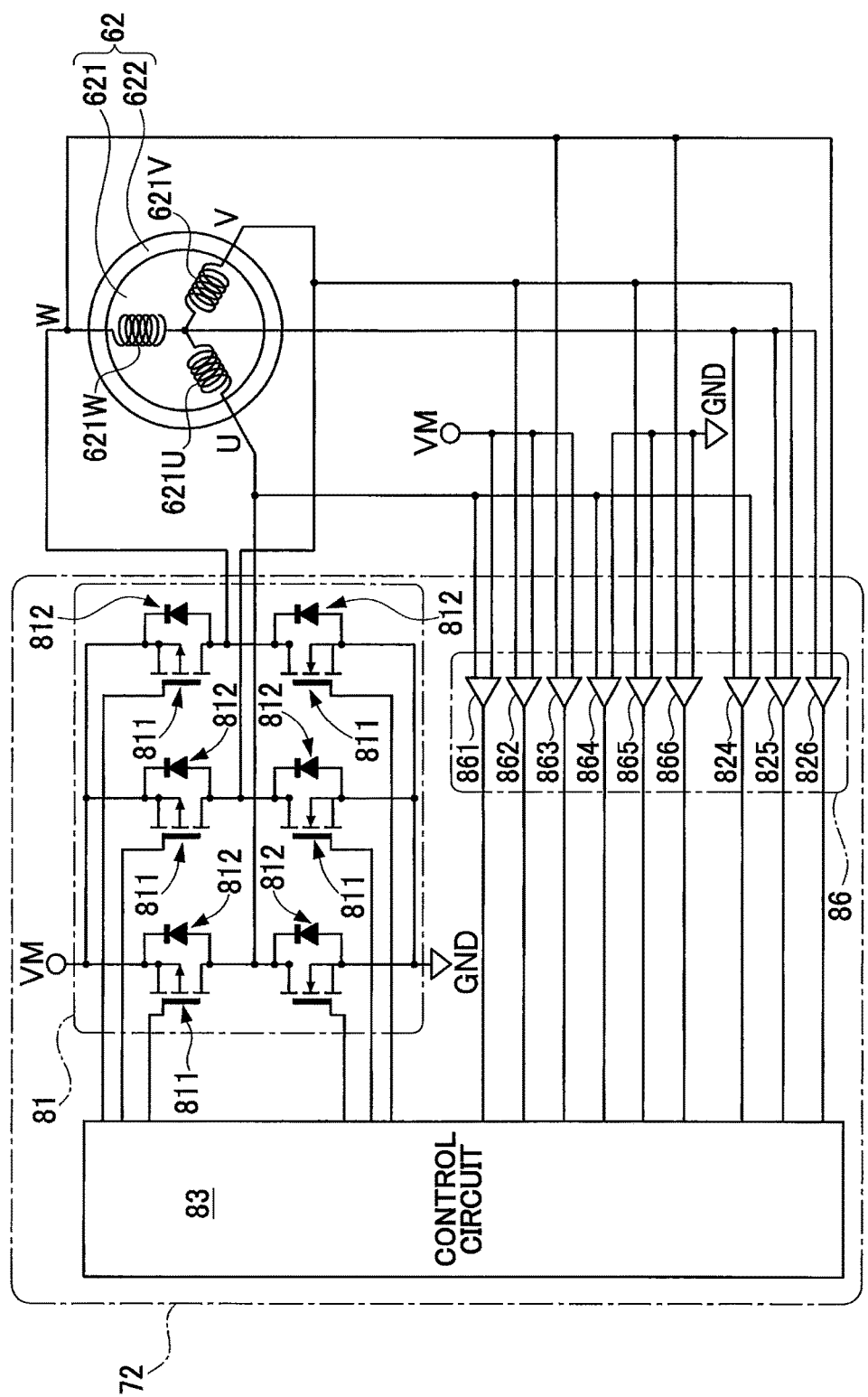
FIG. 8 is a schematic diagram illustrating structures of the brushless motor and a motor driving section according to a second embodiment.

As shown in FIG. 8, the printer 100 according to the second embodiment includes a comparator 86 instead of the comparator 82 in the first embodiment. The comparator 86 includes a UM comparator 861, a VM comparator 862, a WM comparator 863, a UG comparator 864, a VG comparator 865, and a WG comparator 866. The comparators 861, 862, and 863 compares the voltage of the power supply MV, which is the positive side in the inverter circuit 81, with respective ones of the voltages of U-phase, V-phase, and W-phase. The comparators 864, 865, and 866 compares the ground voltage (GND), which is the negative side in the inverter circuit 81, with respective ones of the voltages of U-phase, V-phase, and W-phase.

Specifically, the UM comparator 861 compares the voltage of the power supply VM with the voltage of the U-phase. The VM comparator 862 compares the voltage of the power supply VM with the voltage of the V-phase. The WM comparator 863 compares the voltage of the power supply VM with the voltage of the W-phase. The UG comparator 864 compares the ground voltage (GND) with the voltage of the U-phase. The VG comparator 865 compares the ground voltage (GND) with the voltage of the V-phase. The WG comparator 866 compares the ground voltage (GND) with the voltage of the W-phase.

The comparator 86 further includes the UC comparator 824, the VC comparator 825, and the WC comparator 826, similarly to the comparator 82. The UC comparator 824 compares the voltage of the U-phase and the voltage of the neutral point. The VC comparator 825 compares the voltage of the V-phase and the voltage of the neutral point. The WC comparator 826 compares the voltage of the W-phase and the voltage of the neutral point.

As shown in FIG. 5, the induced voltage is generated in the brushless motor 62. As described above, the counter electromotive voltage (A), which is generated after the coil is set (switched) from the high side coil to the non-energized coil, is lower than the ground voltage (GND). The counter electromotive voltage (B), which is generated after the coil is set (switched) from the low side coil to the non-energized coil, is higher than the voltage of the power supply VM. According to the second embodiment, the mask periods are set on the basis of the results of comparison by the comparators 861-866 in the comparator 86, and the positional signal is acquired on the basis of the results of comparison by the comparators 824-826 during periods other than the mask periods.

In the second embodiment, detection periods for detecting the zero cross signal and the mask periods are set as shown in the followings.

(4) In a case where the zero cross signal of the U-phase is detected (energized state is V→W or W→V),
the mask period is set when U-phase voltage>voltage of power supply VM and U-phase voltage>GND,
the mask period is set when U-phase voltage<voltage of power supply VM and U-phase voltage<GND, and
the detection period is set when U-phase voltage<voltage of power supply VM and U-phase voltage>GND.

(5) In a case where the zero cross signal of the V-phase is detected (energized state is U→W or W→U),
the mask period is set when V-phase voltage>voltage of power supply VM and V-phase voltage>GND,
the mask period is set when V-phase voltage<voltage of power supply VM and V-phase voltage<GND, and
the detection period is set when V-phase voltage<voltage of power supply VM and V-phase voltage>GND.

(6) In a case where the zero cross signal of the W-phase is detected (energized state is U→V or V→U),
the mask period is set when W-phase voltage>voltage of power supply VM and W-phase voltage>GND,
the mask period is set when W-phase voltage<voltage of power supply VM and W-phase voltage<GND, and
the detection period is set when W-phase voltage<voltage of power supply VM and W-phase voltage>GND.

Figure 9:
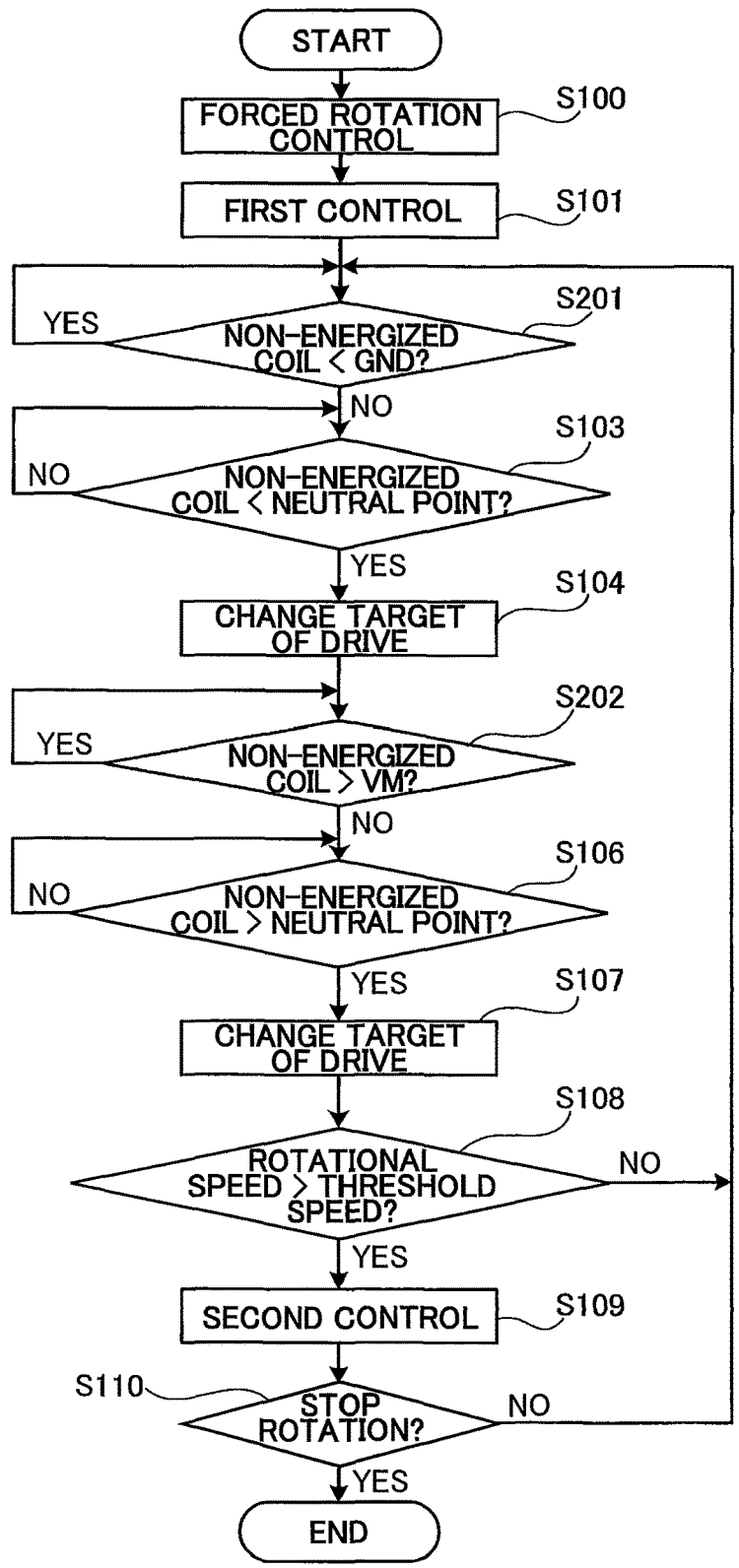
FIG. 9 is a flowchart illustrating a process for controlling rotation of the brushless motor according to the second embodiment.

The process for controlling rotation of the brushless motor 62 will be explained while referring to the flowchart shown in FIG. 9.

In the second embodiment, in S201 the motor driving section 72 compares the non-energized coil with the ground voltage GND instead of executing S102. Specifically, after starting energizing coils, the motor driving section 72 determines whether the voltage of the non-energized coil is lower than the ground voltage GND.

While it is determined that the voltage of the non-energized coil is lower than the ground voltage GND (S201: YES), the motor driving section 72 repeatedly executes the determination 5201. 5201 is an example of a second mask setting process. On the other hand, when it is determined that the voltage of the non-energized coil is not lower than the ground voltage GND (S201: NO), the motor driving section 72 proceeds to S103.

In S202 the motor driving section 72 compares the non-energized coil with the power supply VM, instead of S105 shown in FIG. 6. That is, after in S104 the motor driving section 72 changes the target of drive, in 5202 the motor driving section 72 determines whether the voltage of the non-energized coil is higher than the voltage of the power supply VM. Because the comparison (S106) between the voltage of the non-energized coil and the neutral point is not executed until the voltage of the non-energized coil is lower than or equal to the voltage of the power supply VM (S202: NO), the period in which the YES determination is made in S105 corresponds to the mask period.

While it is determined that the voltage of the non-energized coil is higher than the voltage of the power supply VM (S202: YES), the motor driving section 72 repeatedly perform the determination 5202. 5202 is an example of a second mask setting process. When it is determined that the voltage of the non-energized coil is not higher than the voltage of the power supply VM (S202: NO), the motor driving section 72 proceeds to S106. Because the comparison (S103) between the voltage of the non-energized coil and the neutral point is not executed until the voltage of the non-energized coil is higher than or equal to GND (S201: NO), the period in which YES determination is made in S201 corresponds to the mask period. The steps subsequent to S106 is the same as those in the first embodiment.

The steps except S201 and S202 are the same as steps in FIG. 6. According to the second embodiment, the mask periods can be properly set similarly to the first embodiment.

Figure 10:
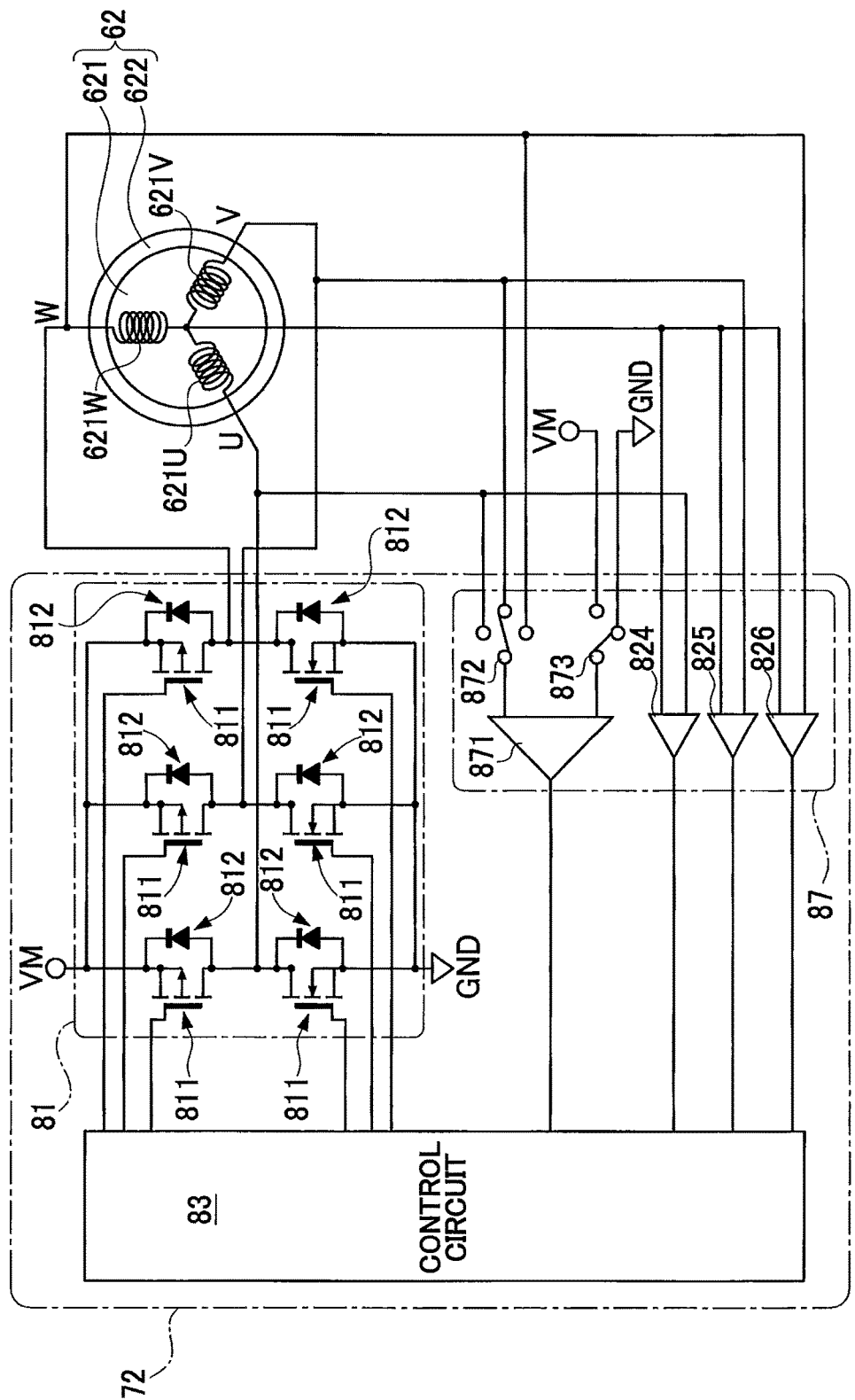
FIG. 10 is a schematic diagram illustrating structures of the brushless motor and a motor driving section according to a modification of the second embodiment.

As shown in FIG. 8, the comparator 86 of the motor driving section 72 includes the UM comparator 861, the VM comparator 862, the WM comparator 863, the UG comparator 864, the VG comparator 865, and the WG comparator 866 in the second embodiment. However, the structure of the comparator 86 is not limited to this. For example, as shown in FIG. 10, the motor driving section 72 includes a comparator 87 having a comparator 871, switches 872 and 873, and the UC comparator 824, the VC comparator 825, and the WC comparator 826. The switch 872 connects the one terminal of the comparator 871 to selective one of the U-phase coil, the V-phase coil, and the W-phase coil. The switch 873 connects the another terminal of the comparator 871 to selective one of the power supply VM and the ground GND. The comparator 87 can performs the process the same as that performed by the comparator 86 (the comparators 861-866) while setting the switch 872 to be connected to corresponding one of the coils 621U, 621V, and 621W and the switch 873 to be connected to corresponding one of the power supply VM ante the ground GND. For example, instead of using the result of comparison by the UV comparator 861, the result of the comparator 871 can be used while the switch 872 is connected to the U-phase coil and the switch 873 is connected to the power supply VM.

As described above, during the induced voltage is generated, the voltage generated in the specific period which is in the non-energized period is higher than the voltage of the power supply VM which is a positive side, or higher than the ground voltage (GND) which is a negative side. In the printer 100 of the second embediment, the period in which the induced voltage is generated can precisely recognized by comparing the voltage of the non-energized coil with the voltage of the power supply VM or the ground voltage GND, and thus the mask period can be set with high accuracy. As a result, it is highly likely that the energized coils can be changed using the induced voltage even if the brushless motor 62 rotates at high speed.

While the disclosure has been described in detail with reference to the above embodiments, it would be apparent to those skilled in the art that various changes and modifications may be made thereto. For example, the present invention can be applicable to apparatuses having a brushless motor such as a multifunction peripheral, a scanner, and a facsimile as well as a printer.

The printer 100 according to the embodiments, the toner image on the photosensitive member 2 is directly transferred to the image. However, the printer 100 may be an intermediate type printer in which the toner image is transferred to the conveyance belt 7 and further the toner image on the conveyance belt 7 is transferred to the sheet.

In the printer of the embodiments, the signal outputted from the BD sensor 71 is used not only to acquire the rotational speed of the brushless motor 62 but also to determine start writing the scan line. Thus, the BD sensor 71 is located a position before the laser light enters the exposure range. However, an additional sensor dedicated for acquiring the rotational speed may be located at a position after the laser light exits the exposure range.

Figure 11:
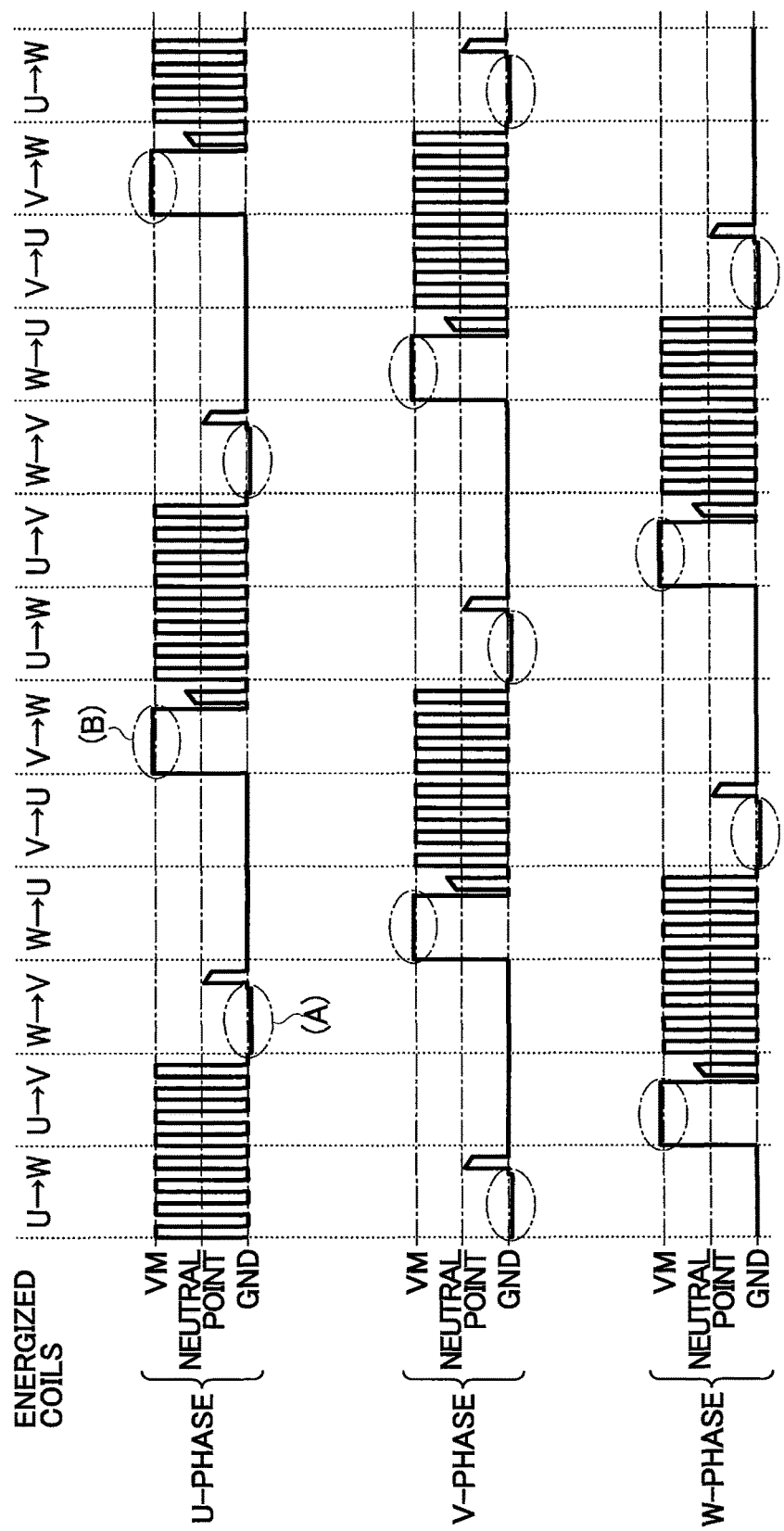
FIG. 11 is a wave form chart illustrating an example of induced voltages generated in coils in the brushless motor according to a modification.

In the first and second embodiments, after the mask period, it is determined that the voltage of the non-energized coil reaches the voltage of the neutral point (zero cross point) on the basis of the result of comparison using the comparator 82, 85, 86, or 87. However, as shown in FIG. 11, when the period in which the induced voltage is generated is long for example, there is a possibility that the zero cross point may be included in the mask period. In this case, NO determination may not be made in S103 or S106, and thus YES determinations are repeated in S103 or S106. In this case, when it is determined that the voltage of the non-energized coil has reached the voltage of the neutral point at the end of the mask period, the printer 100 may change the target of drive after a fixed time period is elapsed from the timing of the end of the mask period.

The processes in the embodiments may be executed a single CPU, a plurality of CPUs, hardware such as ASIC, and any combination of these. The processes or steps in the embodiments may be achieved by manners such as the computer-readable storage medium storing the programs, or methods.

What is claimed is:

1. A brushless motor apparatus comprising:
 a brushless motor having:
  a rotor having a magnet; and
  a stator having a first coil, a second coil, and a third coil which are Y-connected; and
 a controller having an inverter circuit configured to selectively drive the first coil, the second coil, and the third coil,
 wherein the controller is configured to:
  detect an induced voltage generated in a specific coil while the rotor rotates, the specific coil being a coil which is not driven by the inverter circuit among the first coil, the second coil, and the third coil;
  execute comparison between the detected induced voltage and a reference value;
  acquire a positional signal of the rotor on a basis of a timing when the detected induced voltage is the reference value, the timing being obtained through the comparison;
  switch a coil driven by the inverter circuit among the first coil, the second coil, and the third coil on a basis of the positional signal; and
  set a mask period on a basis of a result of comparison between a voltage of the specific coil and a voltage of a coil other than the specific coil among the first coil, the second coil, and the third coil, wherein the comparison between the induced voltage and the reference value is not executed in the mask period.

2. The brushless motor apparatus according to claim 1, wherein the controller is configured to further switch coils driven by the inverter circuit in a cyclic order of the first coil, the second coil, and the third coil,
 wherein in a case where the specific coil is the first coil, and where the third coil and the second coil are driven so that the third coil is at a positive side and the second coil is at a negative side, the controller is configured to set the mask period to be a period during which voltage of the first coil is higher than voltage of the third coil,
 wherein in a case where the specific coil is the first coil, and where the second coil and the third coil are driven so that the second coil is at the positive side and the third coil is at the negative side, the controller is configured to set the mask period to be a period during which voltage of the first coil is smaller than voltage of the third coil.

3. The brushless motor apparatus according to claim 1, wherein the first coil, the second coil, and the third coil are Y-connected at a neutral point,
 wherein the reference value is based on voltage at the neutral point of the first coil, the second coil, and the third coil.

4. The brushless motor apparatus according to claim 1, further comprising:
 a reflection mirror configured to rotate together with the rotor; and
 a light source configured to irradiate a light beam toward the reflection mirror.

5. The brushless motor apparatus according to claim 4, further comprising a light sensor configured to receive the light beam reflected by the reflection mirror,
 wherein the controller is configured to further:
 execute a first acquisition process for acquiring a rotational speed of the rotor on a basis of the positional signal; and
 execute a second acquisition process for acquiring the rotational speed of the rotor on a basis of a detection signal outputted from the light sensor.

6. The brushless motor apparatus according to claim 5, wherein after the rotor starts rotation and before the rotational speed is a threshold speed, the controller acquires the rotational speed of the rotor by executing the first acquisition process,
 wherein after the rotational speed is the threshold speed, the controller acquires the rotational speed of the rotor by executing the second acquisition process.

7. A method for controlling a brushless motor apparatus, comprising:

detecting an induced voltage generated in a specific coil while a rotor of a brushless motor rotates, the specific coil being a coil which is not driven by an inverter circuit among a first coil, a second coil, and a third coil, a stator of the brushless motor having the first coil, the second coil, and the third coil which are Y-connected;

executing comparison between the detected induced voltage and a reference value;

acquiring a positional signal of the rotor on a basis of a timing when the detected induced voltage is the reference value, the timing being obtained through the comparison;

switching a coil driven by the inverter circuit among the first coil, the second coil, and the third coil on a basis of the positional signal; and setting a mask period on a basis of a result of comparison between a voltage of the specific coil and a voltage of a coil other than the specific coil among the first coil, the second coil, and the third coil, wherein the comparison between the induced voltage and the reference value is not executed in the mask period.

8. A brushless motor apparatus comprising;
a brushless motor having:
  a rotor having a magnet; and
  a stator having a first coil, a second coil, and a third coil which are Y-connected; and
a controller having an inverter circuit configured to selectively drive the first coil, the second coil, and the third coil,
wherein the controller is configured to:
  detect an induced voltage generated in a specific coil while the rotor rotates, the specific coil being a coil which is not driven by the inverter circuit among the first coil, the second coil, and the third coil;
  execute first comparison between the detected induced voltage and a reference value;
  acquire a positional signal of the rotor on a basis of a timing when the detected induced voltage is a reference value, the timing being obtained through a result of the first comparison;
  switch a coil by the inverter circuit among the first coil, the second coil, and the third coil on a basis of the positional signal; and
  set a mask period on a basis of at least one of a result of second comparison and a result of third comparison, the second comparison being comparison between a voltage of the specific coil and a positive side voltage of the invertor circuit, the third comparison being comparison between the voltage of the specific coil and a negative side voltage of the invertor circuit, wherein the first comparison is not executed in the mask period.

9. The brushless motor apparatus according to claim 8, wherein the controller is configured to change the coil driven by the inverter circuit in a cyclic order of the first coil, the second coil, and the third coil,
  wherein in a case where the specific coil is the first coil, and where the third coil and the second coil are driven so that the third coil is at a positive side and the second coil is at a negative side, the controller is configured to set the mask period to be a period during which voltage of the first coil is higher than the positive side voltage of the invertor circuit,
  wherein in a case where the specific coil is the first coil, and where the second coil and the third coil are driven so that the second coil is at the positive side and the third coil is at the negative side, the controller is configured to set the mask period to be a period during which voltage of the first coil is smaller than the negative side voltage of the invertor circuit.

10. The brushless motor apparatus according to claim 8, wherein the first coil, the second coil, and the third coil are Y-connected at a neutral point,
  wherein the reference value is based on voltage at the neutral point of the first coil, the second coil, and the third coil.

11. The brushless motor apparatus according to claim 8, further comprising:
  a reflection mirror configured to rotate together with the rotor; and
  a light source configured to irradiate a light beam toward the reflection mirror.

12. The brushless motor apparatus according to claim 11, further comprising a light sensor configured to receive the light beam reflected by the reflection mirror,
  wherein the controller is configured to further:
  execute a first acquisition process for acquiring a rotational speed of the rotor on a basis of the positional signal; and
  execute a second acquisition process for acquiring the rotational speed of the rotor on a basis of a detection signal outputted from the light sensor.

13. The brushless motor apparatus according to claim 12, wherein after the rotor starts rotation and before the rotational speed is a threshold speed, the controller acquires the rotational speed of the rotor by executing the first acquisition process,
  wherein after the rotational speed is the threshold speed, the controller acquires the rotational speed of the rotor by executing the second acquisition process.

* * * * *